US012640815B2

(12) United States Patent
Lee

(10) Patent No.: US 12,640,815 B2
(45) Date of Patent: May 26, 2026

(54) OPTICAL COMMUNICATION MODULE CAPABLE OF CONTROLLING OPTICAL POWER AND OPTICAL COMMUNICATION APPARATUS INCLUDING THE SAME

(71) Applicant: SOLiD, INC., Seongnam-si (KR)

(72) Inventor: Eun Sung Lee, Ansan-si (KR)

(73) Assignee: SOLID, INC., Seongnam-si (KR)

( * ) Notice: Subject to any disclaimer, the term of this patent is extended or adjusted under 35 U.S.C. 154(b) by 1160 days.

(21) Appl. No.: 17/454,713

(22) Filed: Nov. 12, 2021

(65) Prior Publication Data

US 2022/0158734 A1 May 19, 2022

(30) Foreign Application Priority Data

Nov. 13, 2020 (KR) ........................ 10-2020-0152037

(51) Int. Cl.
*H04B 10/564* (2013.01)
*H04B 10/296* (2013.01)
*H04J 14/02* (2006.01)

(52) U.S. Cl.
CPC ...... *H04B 10/296* (2013.01); *H04J 14/02216* (2023.08); *H04J 14/0227* (2013.01)

(58) Field of Classification Search
CPC ............................ H04B 10/564; H04B 10/674
See application file for complete search history.

(56) References Cited

U.S. PATENT DOCUMENTS 6,738,584 B1 * 5/2004 Tsuda ................ H04B 10/2525
398/160
2002/0178417 A1 * 11/2002 Jacob ................ H04J 14/02216
714/704

(Continued)

FOREIGN PATENT DOCUMENTS

JP 2009-267950 A 11/2009
KR 2000-0038246 A 7/2000
(Continued)

OTHER PUBLICATIONS

Office Action issued Nov. 12, 2024 in Korean Patent Application No. 10-2020-0152037.

(Continued)

*Primary Examiner* — Shi K Li
(74) *Attorney, Agent, or Firm* — Sughrue Mion, PLLC

(57) ABSTRACT
According to an aspect of the disclosure, an optical communication module comprises an optical transmission assembly configured to generate first transmit light based on an input electric signal and output the first transmit light, an optical reception assembly configured to divide input first receive light into first receive payload data and first receive auxiliary management data, and an auxiliary management controller configured to analyze the first receive auxiliary management data and control attenuation of one or more of transmit light output from the optical transmission assembly and receive light input to the optical reception assembly, wherein the first receive light is formed by combining the first receive payload data and the first receive auxiliary management data, and the first receive payload data and the first receive auxiliary management data have different wavelengths.

6 Claims, 6 Drawing Sheets

(56)                    References Cited

U.S. PATENT DOCUMENTS

| | | | | |
|---|---|---|---|---|
| 2006/0133826 A1* | 6/2006 | Hamilton-Gahart ... | H04B 10/66 | |
| | | | | 398/207 |
| 2011/0158642 A1* | 6/2011 | Barnard .............. | H04J 14/0287 | |
| | | | | 398/52 |
| 2011/0188861 A1* | 8/2011 | O'Sullivan ......... | H04J 14/0279 | |
| | | | | 398/81 |
| 2014/0079385 A1* | 3/2014 | Shukunami ........ | H04B 10/0775 | |
| | | | | 398/16 |

FOREIGN PATENT DOCUMENTS

| | | | |
|---|---|---|---|
| KR | 2003-0033412 A | 5/2003 | |
| KR | 10-2008-0019190 A | 3/2008 | |
| WO | 2017/104075 A1 | 6/2017 | |
| WO | 2019/233543 A1 | 12/2019 | |

OTHER PUBLICATIONS

Office Action issued Jul. 28, 2025 in Korean Patent Application No. 10-2020-0152037.

* cited by examiner

100

100

OPTICAL COMMUNICATION MODULE
(140-n or 150-n)

S410 — TRANSMIT FIRST TRANSMIT LIGHT

S420 — COMPARE POWER LEVEL OF FIRST
TRANSMIT LIGHT WITH PRESET
TRANSMIT THRESHOLD POWER

S430 — CONTROL TRANSMISSION ATTENUATOR
BASED ON RESULT OF COMPARING

END

FIG. 7

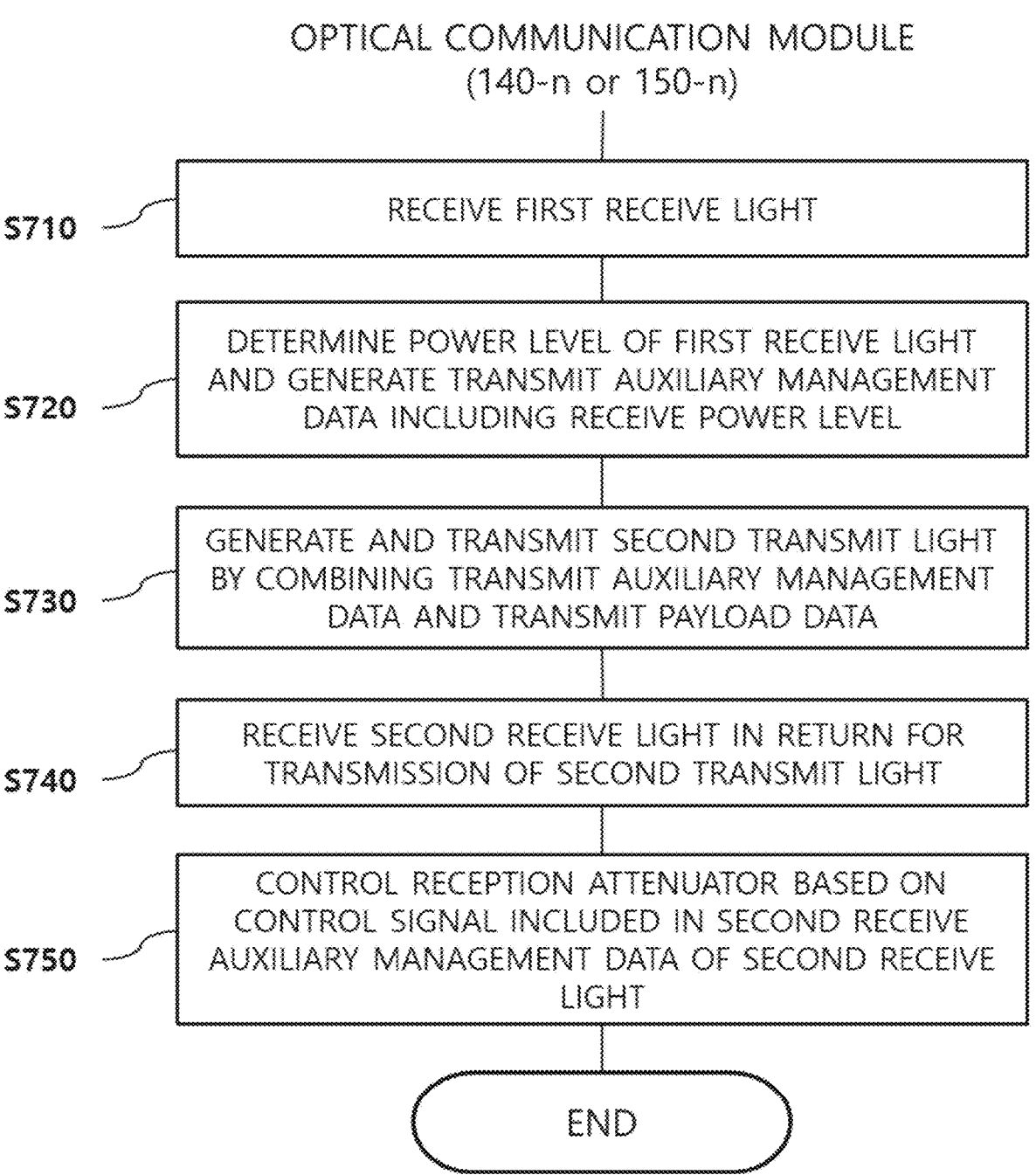

OPTICAL COMMUNICATION MODULE
(140-n or 150-n)

S710 — RECEIVE FIRST RECEIVE LIGHT

S720 — DETERMINE POWER LEVEL OF FIRST RECEIVE LIGHT AND GENERATE TRANSMIT AUXILIARY MANAGEMENT DATA INCLUDING RECEIVE POWER LEVEL

S730 — GENERATE AND TRANSMIT SECOND TRANSMIT LIGHT BY COMBINING TRANSMIT AUXILIARY MANAGEMENT DATA AND TRANSMIT PAYLOAD DATA

S740 — RECEIVE SECOND RECEIVE LIGHT IN RETURN FOR TRANSMISSION OF SECOND TRANSMIT LIGHT

S750 — CONTROL RECEPTION ATTENUATOR BASED ON CONTROL SIGNAL INCLUDED IN SECOND RECEIVE AUXILIARY MANAGEMENT DATA OF SECOND RECEIVE LIGHT

END

1

OPTICAL COMMUNICATION MODULE CAPABLE OF CONTROLLING OPTICAL POWER AND OPTICAL COMMUNICATION APPARATUS INCLUDING THE SAME

CROSS-REFERENCE TO RELATED APPLICATION

This application claims the benefit of Korean Patent Application No. 10-2020-0152037, filed on Nov. 13, 2020, in the Korean Intellectual Property Office, the disclosures of which are incorporated herein in its entirety by reference.

BACKGROUND

1. Field

The disclosure relates to an optical communication module and optical communication apparatus including the same, and more particularly, to an optical communication module and optical communication apparatus, in which the optical communication module, such as small form-factor pluggable (SFP) included in the optical communication apparatus capable of autonomously controlling optical power.

2. Description of the Related Art

Wavelength division multiplexing (WDM) based subscriber networks are being actively studied and developed. Communication between a central base station and subscribers in a WDM based passive optical network (hereinafter, referred to as WDM-PON) adopts a method that uses a wavelength dedicated to each subscriber for communication. As the WDM-PON uses the dedicated wavelength for each subscriber, it may guarantee better security, enable massive communication services, and have an advantage of applying a different communication technique (e.g., a link rate, a frame format, etc.) for each subscriber or each service.

Dense wavelength division multiplexing (DWDM) wavelengths of various optical communication modules (e.g., optical transceivers such as SFP) in the WDM-PON may have different output values depending on characteristics of laser diodes of the optical communication modules, so long-range communication has a problem of being easily influenced by an adjacent channel due to chromatic dispersion and/or nonlinear phenomena.

Traditionally, a method is used to solve this problem, in which a manager visits the site in person, where an optical communication apparatus is installed and installs an optical signal level attenuator on the outside of the optical communication module to attenuate the optical signal transmitted to a suitable level. This method gives the manager some hassle of having to visit the site.

Such a problem may be equally caused even in a re-configurable optical add-drop multiplexer or optical add-drop multiplexer (OADM) based optical communication system.

SUMMARY

The disclosure provides an optical communication module capable of properly attenuating the level of an optical signal transmitted therefrom without the need for a manager to have to go to the site.

According to an aspect of the disclosure, an optical communication module comprises an optical transmission assembly configured to generate first transmit light based on an input electric signal and output the first transmit light, an optical reception assembly configured to divide input first receive light into first receive payload data and first receive auxiliary management data, and an auxiliary management controller configured to analyze the first receive auxiliary management data and control attenuation of one or more of transmit light output from the optical transmission assembly and receive light input to the optical reception assembly, wherein the first receive light is formed by combining the first receive payload data and the first receive auxiliary management data, and the first receive payload data and the first receive auxiliary management data have different wavelengths.

According to an exemplary embodiment, the optical communication module further comprises a transmission attenuator connected to the optical transmission assembly and configured to attenuate a power level of an optical signal input from the optical transmission assembly, and the auxiliary management controller is configured to compare a power level of the first transmit light with preset transmit threshold power and control the transmission attenuator according to a result of the comparing.

According to an exemplary embodiment, the optical communication module further comprises a transmission attenuator connected to the optical transmission assembly and configured to attenuate a power level of an optical signal input from the optical transmission assembly, and the auxiliary management controller is configured to control the transmission attenuator by analyzing other-apparatus-receive-power included in the first receive auxiliary management data.

According to an exemplary embodiment, the optical communication module further comprises a reception attenuator arranged between a multiplexer and the optical reception assembly and configured to attenuate a power level of an optical signal input from the multiplexer and output the attenuated optical signal to the optical reception assembly, and the auxiliary management controller is configured to compare a power level of the first receive light with preset receive threshold power and control the reception attenuator according to a result of the comparing.

According to an exemplary embodiment, the auxiliary management controller is configured to determine a power level of the first receive light to generate a receive power level, generate and output transmit auxiliary management data including the receive power level to the optical transmission assembly, and the optical transmission assembly is configured to generate second transmit light by combining the transmit auxiliary management data and transmit payload data and output the second transmit light.

According to an exemplary embodiment, the optical reception assembly is configured to divide second receive light input to correspond to the output of the second transmit light into second receive payload data and second receive auxiliary management data and output the second receive payload data and the second receive auxiliary management data, and the auxiliary management controller is configured to control attenuation of receive light input to the optical reception assembly based on control information included in the second receive auxiliary management data.

According to an exemplary embodiment, the optical communication module further comprises a reception attenuator arranged between a multiplexer and the optical reception assembly and configured to attenuate a power level of an optical signal input to the multiplexer and output the attenuated optical signal to the optical reception assembly, and the auxiliary management controller is configured to control the reception attenuator based on the control information.

According to an exemplary embodiment, the auxiliary management controller comprises an auxiliary management and control channel (AMCC) controller, and the receive auxiliary management data is received through the AMCC.

According to an aspect of the disclosure, an optical communication apparatus including at least one of the above optical communication module is disclosed.

BRIEF DESCRIPTION OF THE DRAWINGS

The above and other features and advantages of the disclosure will become more apparent by describing in detail exemplary embodiments thereof with reference to the accompanying drawings in which:

FIGS. 4 to 7 are flowcharts of a method of automatically controlling optical power of an optical communication module, according to embodiments of the disclosure.

DETAILED DESCRIPTION

Figure 1:
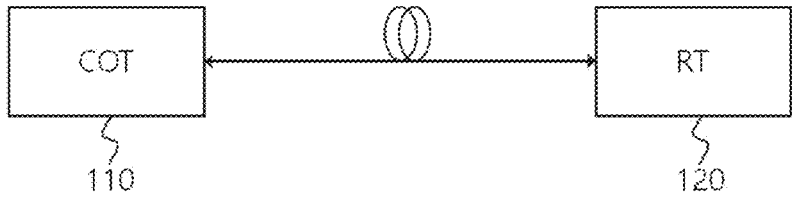
FIG. 1 is a block diagram of an optical communication system, according to an embodiment of the disclosure.

Various modifications may be made to embodiments of the disclosure, which will be described more fully hereinafter with reference to the accompanying drawings. The disclosure may be embodied in many different forms and should not be construed as limited to the embodiments of the disclosure set forth herein; rather, these embodiments of the disclosure are provided so that the disclosure will be thorough and complete, and will fully convey the scope of the disclosure to those of ordinary skill in the art.

Descriptions of some well-known technologies that possibly obscure the disclosure will be omitted.

If it is determined that a detailed description of commonly-used technologies or structures related to the embodiments of the disclosure may unnecessarily obscure the subject matter of the disclosure, the detailed description will be omitted. Ordinal numbers (e.g., first, second, etc.) as herein used are to distinguish components from one another.

When the term "connected" or "coupled" is used, a component may be directly connected or coupled to another component. However, unless otherwise defined, it is also understood that the component may be indirectly connected or coupled to the other component via another new component.

The terms "unit", "device", "~er (~or)", "module", etc., refer to a processing unit of at least one function or operation, which may be implemented by hardware such as a processor, a microprocessor, a micro controller, a central processing unit (CPU), a graphics processing unit (GPU), an accelerate processor unit (APU), a digital signal processor (DSP), an application specific integrated circuit (ASIC), a field programmable gate array (FPGA), etc., software, or a combination of hardware and software.

Throughout the specification, components may be discriminated by their major functions. For example, two or more components as herein used may be combined into one, or a single component may be subdivided into two or more sub-components according to subdivided functions. Each of the components may perform its major function and further perform part or all of a function served by another component. In this way, part of a major function served by each component may be dedicated and performed by another component.

In embodiments of the disclosure, an optical communication system may be applied to various optical communication networks based on a wavelength division multiplexing (WDM) based passive optical network (hereinafter, referred to as a WDM-PON), which include optical communication apparatuses remotely located from each other for transmitting or receiving optical signals through their respective optical communication modules (e.g., optical transceivers).

For example, the optical communication system may constitute an optical transport network, which is a sub-network being a fronthaul segment of a radio access network architecture. It is not, however, limited thereto, and the disclosure may be equally applied to e.g., midhaul and backhaul segments of the radio access network architecture. In another example, the optical communication system may be applied to an optical subscriber network. In yet another example, the optical communication system may be applied to a distributed antenna system (DAS) to get rid of shadow area of a base station.

For convenience of explanation, an embodiment of the disclosure will now be described by focusing on an optical communication system which constitutes a fronthaul segment of the radio access network architecture, which includes an optical communication apparatus (e.g., central office terminal (COT)) connected to a digital unit or a baseband unit on a central office side and an optical communication apparatus (e.g., remote terminal (RT)) connected to a remote unit or a remote radio head at a remote site.

Various embodiments of the disclosure will be described one by one in detail.

FIG. 1 is a block diagram of an optical communication system, according to an embodiment of the disclosure.

Referring to FIG. 1, an optical communication system 100 according to an embodiment of the disclosure may include a COT 110 and an RT 120. The COT 110 and the RT 120 may be connected by a line, especially, an optical cable.

The COT 110 is a central office device of the optical communication system 100, which may be an apparatus that multiplexes a signal and transmits the multiplexed signal to one or more RTs 120 connected thereto in a PON. For example, assuming a WDM-PON, the COT 110 may receive a signal from an optical line terminal (OLT) (not shown) and convert the received signal to a WDM signal. The COT 110 may transmit optical signals of multiple wavelengths to the RT 120 through a single optical cable. In this case, the COT 110 may include a plurality of optical communication modules for transmitting or receiving optical signals of multiple wavelengths. Furthermore, each of the optical communication modules of the COT 110 may automatically control power of an optical signal to be transmitted to or received from the RT 120.

The RT 120 is the optical communication apparatus connected to the COT 110 through the optical cable, which may be located in an area in which subscribers are concentrated and which requires multiple lines. The RT 120 may demultiplex a WDM signal received from the COT 110 and transmit signals resulting from the demultiplexing to the subscribers. For example, the RT 120 may convert WDM signals distributed from a multiplexer (MUX) 130-2 (see FIG. 2) equipped on its side to PON signals and provide the PON signals to subscribers. Specifically, the COT 110 may transmit optical signals of multiple wavelengths to the RT 120 through a single optical cable. In this case, the RT 120 may include a plurality of optical communication modules for transmitting or receiving optical signals of multiple wavelengths. Each of the optical communication modules of the RT 120 may automatically control power of an optical signal to be transmitted to or received from the COT 110.

An operation of automatically controlling power of an optical signal, which is performed by each optical communication module included in the COT 110 and/or the RT 120 in the optical communication system 100 according to an embodiment of the disclosure will now be described in detail in connection with FIGS. 2 to 7.

Figure 2:
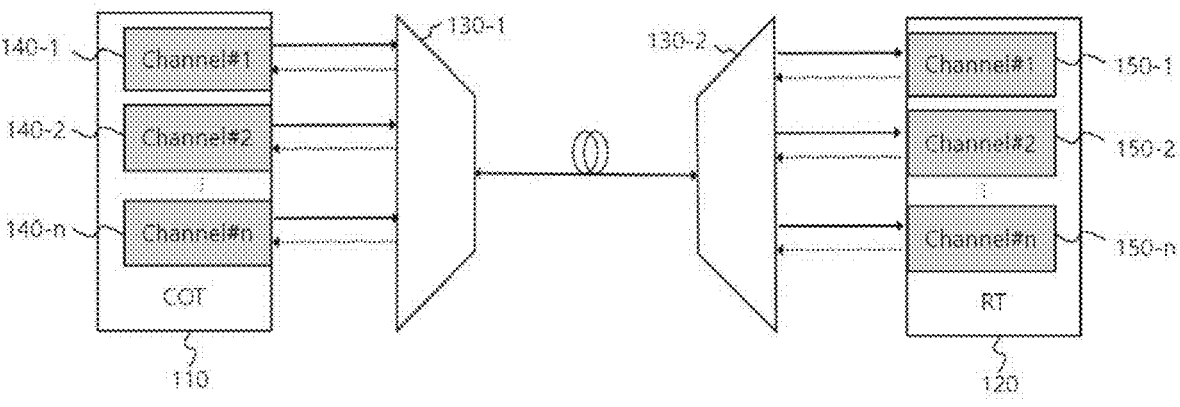
FIG. 2 is a block diagram of an optical communication apparatus, according to an embodiment of the disclosure.
Figure 3:
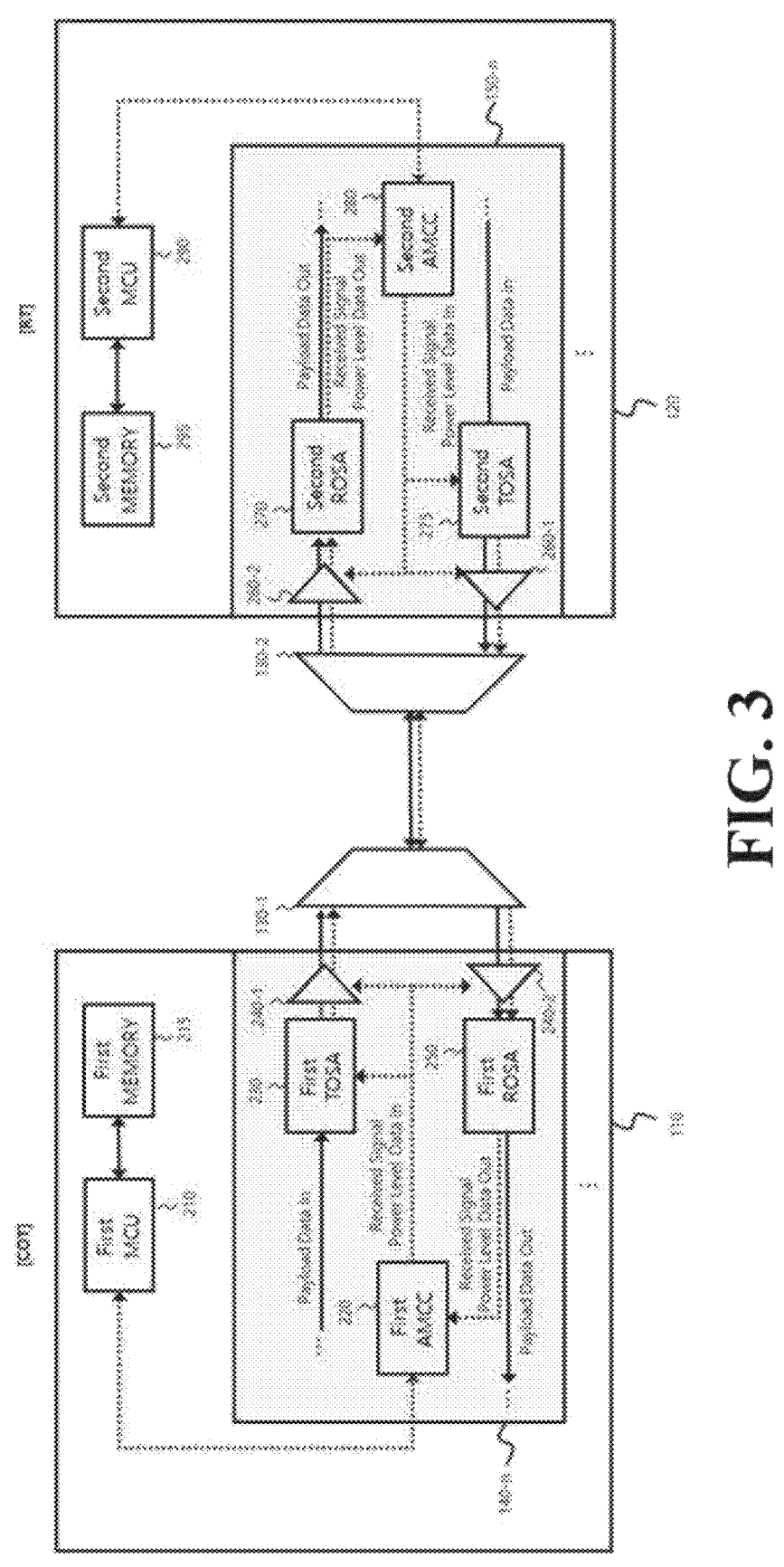
FIG. 3 is a block diagram of an optical communication module, according to an embodiment of the disclosure.

FIG. 2 is a block diagram of an optical communication apparatus, according to an embodiment of the disclosure, and FIG. 3 is a block diagram of an optical communication module, according to an embodiment of the disclosure.

Referring to FIG. 2, the COT 110 may include a first COT optical communication module 140-1, a second COT optical communication module 140-2, . . . , and an n-th COT optical communication module 140-*n*, where n is a natural number. The first to n-th COT optical communication modules 140-1 to 140-*n* may be connected to a first MUX 130-1 to perform optical communication with the RT 120 connected through an optical cable.

The RT 120 may also include a first RT optical communication module 150-1, a second RT optical communication module 150-2, . . . , and an n-th RT optical communication module 150-*n*. The first to n-th RT optical communication modules 150-1 to 150-*n* may be connected to a second MUX 130-2 to perform optical communication with the COT 110 connected through the optical cable. In this case, the first COT optical communication module 140-1 may be connected to the first RT optical communication module 150-1 (i.e., forming a first channel), and the n-th COT optical communication module 140-*n* may be connected to the n-th RT optical communication module 150-*n* (i.e., forming an n-th channel). Wavelengths of the optical signals transmitted or received in the first to n-th channels may all be different.

The optical communication modules 140-1 to 140-*n* and 150-1 to 150-*n* may be optical communication modules such as small form-factor pluggable (SFP) or channel cards including optical communication modules.

Referring to FIG. 3, the COT 110 may include a first main controller (MCU) 210, a first memory 215, the first MUX 130-1, and the n COT optical communication modules 140-1 to 140-*n*. The n-th COT optical communication module 140-*n* may include a first auxiliary management controller (or called an auxiliary management and control channel (AMCC)) 220, a first optical transmission assembly (or called a transmitter optical sub-assembly (TOSA)) 230, a first transmission attenuator 240-1, a first optical reception assembly (or called a receiver optical sub-assembly (ROSA)) 250, and a first reception attenuator 240-2.

The RT 120 may include a second main controller (MCU) 290, a second memory 295, the second MUX 130-2, and the n RT optical communication modules 150-1 to 150-*n*. The n-th RT optical communication module 150-*n* may include a second auxiliary management controller (or AMCC) 280, a second optical transmission assembly (or TOSA) 275, a second transmission attenuator 260-1, a second receiver optical sub-assembly (or ROSA) 270, and a second reception attenuator 260-2.

Operation of each component of the COT 110 and RT 120 will now be described.

First, the first MCU 210 may control general operation of the COT 110. The first memory 215 may be connected to the first MCU 210 and may store various kinds of information and program instructions required for operation of the COT

110. Especially, the first memory 215 may store information about wavelengths of optical signals to be transmitted to or received from the COT 110.

The first AMCC 220 may mange transmission or reception of payload data between the COT 110 and the RT 120. The first AMCC 220 may manage and control the COT 110 without affecting transmission of the payload data. The first AMCC 220 may transmit information required for auxiliary management of payload data transmission or reception (hereinafter, referred to as COT auxiliary management data) to the RT 120 in various methods.

For example, the first AMCC 220 may transmit the COT auxiliary management data and COT payload data to the RT 120 at the same time in a baseband intensity over-modulation method. In another example, the first AMCC 220 may overlap the COT auxiliary management data and the COT payload data and transmit the overlapping data to the RT 120 in a radio frequency (RF) pilot tone method. The baseband intensity over-modulation method is a technology to pile up the COT auxiliary management data on top of the payload data, and the RF pilot tone method is a technology to overlap amplitude shift keying (ASK) or frequency shift keying (FSK) modulated COT auxiliary management data with the payload data. Alternatively, the first AMCC 220 may generate the COT auxiliary management data as a signal of a preset first frequency, which may be totally different from a frequency of the payload data (for example, the COT auxiliary management data has a few kilo hertz (kHz) while the payload data has a tens to hundreds mega hertz (MHz)). Such methods of transmission or reception of COT auxiliary management data as the baseband intensity over-modulation method and the RF pilot tone method are already known to the public, so the detailed description thereof will be omitted.

In particular, the first AMCC 220 may analyze receive light received from the first ROSA 250 and determine a power level of the receive light, generate information about the power level as the COT auxiliary management data, output the COT auxiliary management data to the first TOSA 230 to be combined with the COT payload data. The first AMCC 220 may also control the first transmission attenuator 240-1 and/or the first reception attenuator 240-2 by analyzing receive light received from the first ROSA 250. Furthermore, the first AMCC 220 may also control the first transmission attenuator 240-1 by analyzing transmit light output from the first transmission attenuator 240-1. This will be described later in connection with FIGS. 4 to 7.

The first TOSA 230 is configured to convert the input COT payload data and/or the COT auxiliary management data into an optical signal. The first TOSA 230 may include a laser diode. Especially, the first TOSA 230 may generate the optical signal (i.e., transmit light) by combining the COT auxiliary management data and the COT payload data input from the first AMCC 220.

The first transmission attenuator 240-1 may be configured to attenuate a power level of the transmit light input from the first TOSA 230 at a preset attenuation rate. The attenuation rate of the first transmission attenuator 240-1 may be determined under the control of the first AMCC 220. How the first AMCC 220 determines the attenuation rate of the first transmission attenuator 240-1 will be described later in connection with FIGS. 4 to 7.

The first MUX 130-1 may be configured to multiplex transmit light input from the first transmission attenuator 240-1 and transmit the multiplexed transmit light onto the optical cable, or demultiplex (or deMUX) receive light received from the optical cable and output the deMUXed receive light to the first reception attenuator 240-2.

The first reception attenuator 240-2 may be configured to attenuate a power level of the receive light input from the first MUX 130-1 at a preset attenuation rate. The attenuation rate of the first reception attenuator 240-2 may be determined under the control of the first AMCC 220. How the first AMCC 220 determines an attenuation rate of the first reception attenuator 240-2 will be described later in connection with FIGS. 4 to 7.

The first ROSA 250 may divide the receive light input from the first reception attenuator 240-2 into receive payload data and receive auxiliary management data to be output to corresponding circuits. Especially, the first ROSA 250 may output the receive auxiliary management data to the first AMCC 220. The first ROSA 250 may include a photo diode, and pieces of information output from the first ROSA 250 may pass a trans-impedance amplifier (TIA) to be branched off to corresponding circuits.

The second MCU 290 of the RT 120 may be configured to control general operation of the RT 120. The second memory 295 may be connected to the second MCU 290 and may store various kinds of information and program instructions required for operation of the RT 120.

The second AMCC 280 may be connected to the second MCU wiredly or wirelessly, and may manage transmission or reception of payload data between the COT 110 and the RT 120. The second AMCC 280 may transmit information required for auxiliary management of payload data transmission or reception (hereinafter, referred to as RT auxiliary management data) to the COT 110 in various methods. Like the first AMCC 220, the second AMCC 280 may transmit the RT auxiliary management data to the COT 110 in various methods.

Especially, the second AMCC 220 may analyze receive light received from the second ROSA 270 to determine a power level of the receive light, generate information about the power level as RT auxiliary management data, output the RT auxiliary management data to the second TOSA 275 to be combined with RT payload data. The second AMCC 280 may also control the second transmission attenuator 260-1 and/or the second reception attenuator 260-2 by analyzing the receive light received from the second ROSA 270. Furthermore, the second AMCC 280 may control the second transmission attenuator 260-1 by analyzing transmit light output from the second transmission attenuator 260-1. This will be described later in connection with FIGS. 4 to 7.

The second TOSA 275, the second transmission attenuator 260-1 and the second MUX 130-2 may have RT payload data and RT auxiliary management data to be transmitted to the COT 110 formed into the respective optical signals, combine the optical signals, attenuate the combined optical signal, and then multiplex the optical signal. The second MUX 130-2, the second reception attenuator 260-2 and the second ROSA 270 may demultiplex, attenuate, and convert an optical signal received from the COT 110 into COT payload data and COT auxiliary management data.

In an embodiment of the disclosure, the AMCC 220 and 280 may control the transmission attenuator 240-1 and 260-1 and/or the reception attenuator 240-2 and 260-2 to control power of transmit light and/or receive light, and after this, identify a result of the controlling by monitoring the power level of transmit light and/or receive light output subsequently. When a result of the monitoring indicates that the power of the transmit power and/or receive power has been controlled to a normal level, the AMCC 220 and 280 may keep in the control state of the transmission attenuator

240-1 and 260-1 and/or reception attenuator 240-2 and 260-2. On the other hand, when the power of the transmit power and/or receive power has not been controlled to a normal level, the AMCC 220 and 280 may send a signal such as an alarm to the MCU 210 and 290 of the optical communication apparatus 110 and 120. The MCU 210 and 290 may control operation of the corresponding optical communication module based on the received signal or provide an alarm corresponding to the received signal to an administrator.

General operation of each component of the COT 110 and RT 120 has thus far been described. An operation to automatically control the optical power level, which is performed by each channel card 140-*n* and 150-*n* of the COT 110 and the RT 120, will now be described in detail in connection with FIGS. 4 to 7.

FIGS. 4 to 7 are flowcharts of a method of automatically controlling optical power of an optical communication module, according to embodiments of the disclosure.

The operations, as will be described below, may be operations performed by one of the plurality of COT optical communication modules 140-1 to 140-*n* or the plurality of RT optical communication modules 150-1 to 150-*n*. Accordingly, terms of the components and signals included in each optical communication module will be collectively called as follows:

(1) the COT optical communication module and the RT optical communication module are collectively called an 'optical communication module'

(2) the first auxiliary management controller and the second auxiliary management controller may be collectively called an 'auxiliary management controller'

(3) the first TOSA and the second TOSA may be collectively called a 'TOSA'

(4) the first ROSA and the second ROSA may be collectively called a 'ROSA'

(5) the first transmission attenuator and the second transmission attenuator may be collectively called a 'transmission attenuator'

(6) the first reception attenuator and the second reception attenuator may be collectively called a 'reception attenuator'

(7) an optical signal transmitted from the optical communication module is called 'transmit light'

(8) an optical signal received by the optical communication module is called 'receive light'

(9) payload data transmitted from the optical communication module is called 'transmit payload data'

(10) payload data received by the optical communication module is called 'receive payload data'

(11) auxiliary management data transmitted from the optical communication module is called 'transmit auxiliary management data'

(12) auxiliary management data received by the optical communication module is called 'receive auxiliary management data'

(13) a device (or apparatus) that receives transmit light transmitted from the optical communication module is called 'another device (or another apparatus)'

Figure 4:
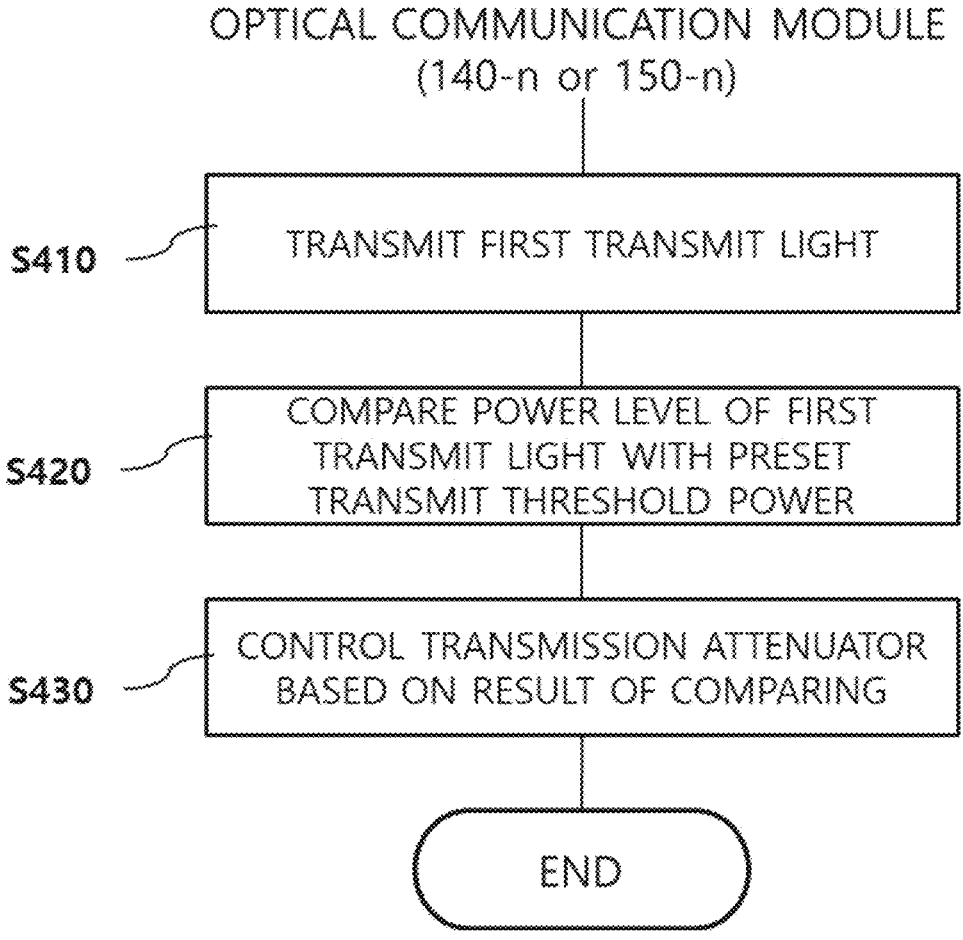

Referring to FIG. 4, in step S410, the optical communication module may transmit first transmit light. For example, the auxiliary management controller may generate and output transmit auxiliary management data to the TOSA. The TOSA may generate first transmit light by combining the transmit auxiliary management data and transmit payload data and output the first transmit light. The transmission attenuator may attenuate the first transmit light at a preset attenuation rate and output the attenuated first transmit light to the MUX, which may in turn transmit it to other apparatus connected through an optical cable. The ordinal number 'first' of the first transmit light is added just to distinguish the transmit light in question from transmit light transmitted subsequently.

In step S420, the optical communication module may compare a power level of the first transmit light with a preset transmit threshold power. The transmit threshold power may be information stored in advance in the memory 215 and 295 of the optical communication module. For example, the auxiliary management controller may monitor power of the first transmit light output through the MUX and compare the power with the transmit threshold power stored in the memory. In this case, the MUX may be connected to a monitoring device (not shown) including a photo diode that detects power of the transmit light and transmits a corresponding electric signal to the auxiliary management controller. Various technologies known to the public may be applied to how the monitoring device monitors transmit light power, so it is natural that they do not limit the scope of the disclosure. The auxiliary management controller may then compare the power of the first transmit light received from the monitoring device with the transmit threshold power stored in the memory 215 and 295.

In step S430, the optical communication module may control the transmission attenuator according to a result of the comparing. For example, when the result of the comparing indicates that the power of the first transmit light exceeds the transmit threshold power, the auxiliary management controller may control the power of transmit light for subsequent transmission to be decreased by increasing the attenuation rate of the transmission attenuator. In this case, the auxiliary management controller may precisely control the attenuation rate of the transmission attenuator based on a difference between the power of the first transmit light and the transmit threshold power.

As described above, according to an embodiment of the disclosure, the optical communication module may automatically maintain the power of transmit light to a suitable level by monitoring the power of transmit light being transmitted and controlling the transmission attenuator.

Figure 5:
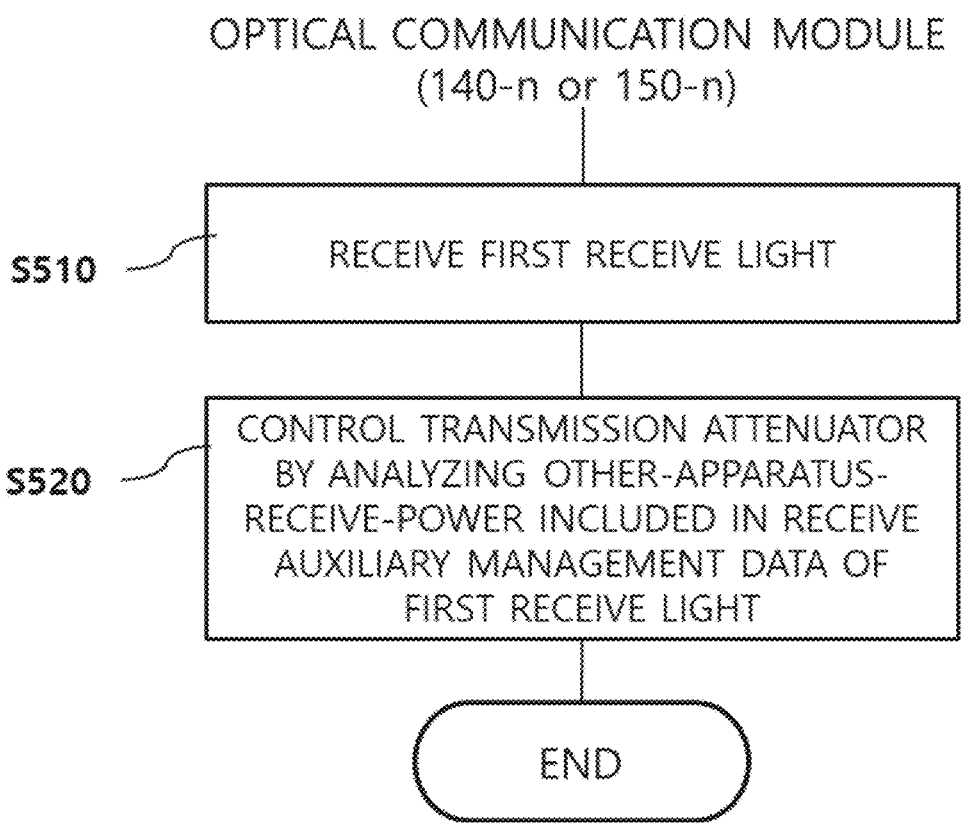

Referring to FIG. 5, in step S510, the optical communication module may receive first receive light. For example, the MUX may receive the first receive light from other apparatus connected through the optical cable, and the reception attenuator may attenuate the first receive light at a preset attenuation rate and then output the attenuated light to the ROSA. The ROSA may divide the first receive light into receive auxiliary management data and receive payload data, and output the receive auxiliary management data to an auxiliary management controller. The ordinal number 'first' of the first receive light is just added to distinguish the receive light in question from receive light received subsequently.

In step S520, the auxiliary management controller may analyze other-apparatus-receive-power included in the receive auxiliary management data of the first receive light to control an attenuation rate of the transmission attenuator. For example, the receive auxiliary management data may include the other-apparatus-receive-power. The other-apparatus-receive-power may be information generated by the other apparatus receiving the first transmit light and then determining a power level of the received transmit light. The other apparatus may generate the other-apparatus-receive-power, generate first receive light with the other-apparatusreceive-power as auxiliary management data, and transmit this to the optical communication module in question.

Accordingly, the auxiliary management controller may compare the other-apparatus-receive-power with preset receive threshold power. The receive threshold power may be information stored in advance in the memory 215 and 295 of the optical communication module. When the result of the comparing indicates that the other-apparatus-receive-power exceeds the receive threshold power, the auxiliary management controller may control the power of transmit light subsequently transmitted to be decreased by increasing the attenuation rate of the transmission attenuator. In this case, the auxiliary management controller may precisely control the attenuation rate of the transmission attenuator based on a difference between the other-apparatus-receive-power and the receive threshold power.

As described above, according to an embodiment of the disclosure, the optical communication module may automatically maintain the power of transmit light to a suitable level by monitoring through the AMCC the power level received from the other device that has received the first transmit light and controlling the transmission attenuator.

Figure 6:
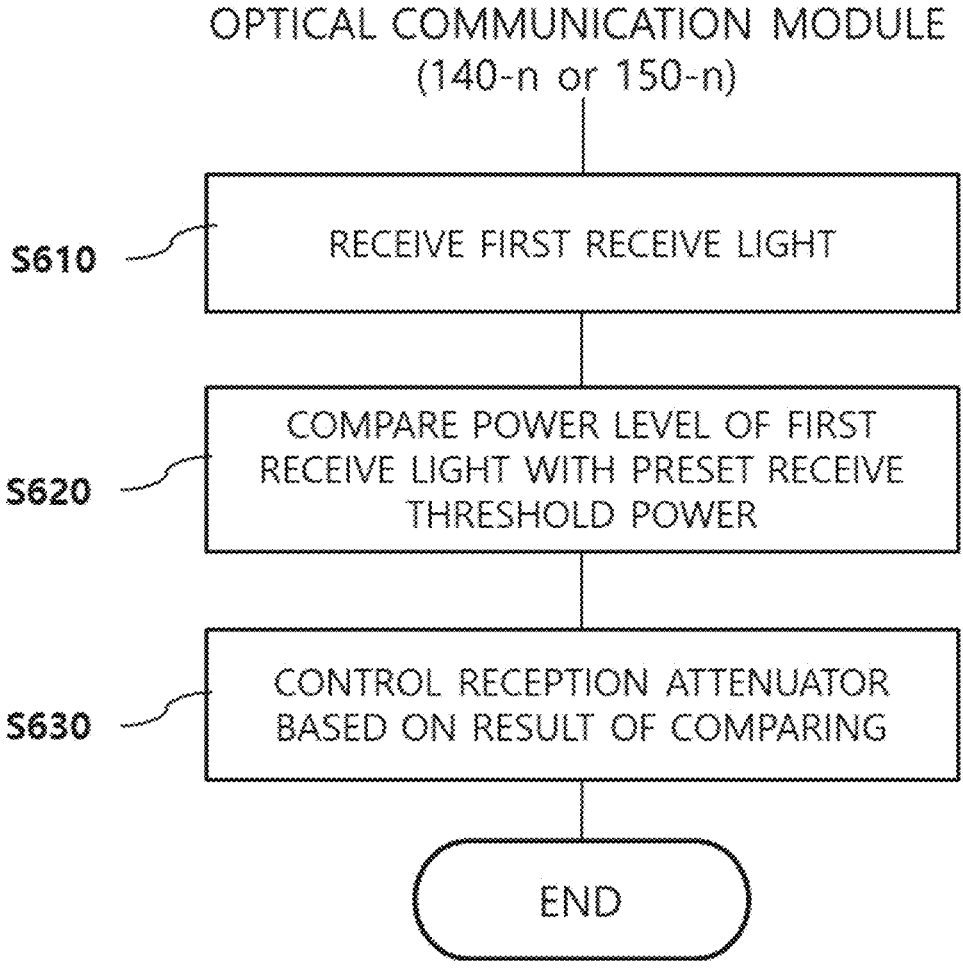

Referring to FIG. 6, in step S610, the optical communication module may receive first transmit light. This is almost the same as the step S510, so the detailed description thereof will not be repeated.

In step S620, the optical communication module may compare a power level of the first receive light with preset receive threshold power. For example, the auxiliary management controller may monitor power of the first receive light received through the MUX and compare the power with the receive threshold power stored in the memory. In this case, the MUX may be connected to a monitoring device (not shown) including a photo diode that detects power of receive light and transmit a corresponding electric signal to the auxiliary management controller. Various technologies known to the public may be applied to how the monitoring device monitors receive light power, so it is natural that they do not limit the scope of the disclosure. The auxiliary management controller may then compare power of the first receive light received from the monitoring device with the receive threshold power stored in the memory 215 and 295. The receive threshold power in the step S620 may be equal to or different from the receive threshold power in the step S520. Whether the two receive threshold power values are the same or not may not limit the scope of the disclosure.

In step S630, the optical communication module may control the reception attenuator according to a result of the comparing. For example, when the result of the comparing between the power level of the first receive light and the preset receive threshold power indicates that the power level of the first receive light exceeds the receive threshold power, the auxiliary management controller may control the power of receive light for subsequent reception to be decreased by increasing the attenuation rate of the reception attenuator. In this case, the auxiliary management controller may precisely control the attenuation rate of the reception attenuator based on a difference between the power level of the first receive light and the receive threshold power.

As described above, according to an embodiment of the disclosure, the optical communication module may automatically maintain the power of receive light to a suitable level by monitoring the power level of the first receive light received and controlling the reception attenuator.

Referring to FIG. 7, in step S710, the optical communication module may receive first transmit light. This is almost the same as the step S510, so the detailed description thereof will not be repeated.

In step S720, the optical communication module may determine a power level of the first receive light and generate transmit auxiliary management data including the receive power level. In this case, the operation of the optical communication module determining a power level of the first receive light may be almost the same as what is described in the step S620. Furthermore, the auxiliary management controller of the optical communication module may generate transmit auxiliary management data, i.e., AMCC data, including the receive power level, which is information about the power level of the first receive light. The auxiliary management controller may output the transmit auxiliary management data to the TOSA.

In step S730, the optical communication module may generate second transmit light by combining the transmit auxiliary management data and transmit payload data. For example, the TOSA may generate the second transmit light by combining the transmit auxiliary management data and the transmit payload data. The TOSA may output the second transmit light to the transmission attenuator, which may in turn output the second transmit light to the MUX, and the MUX may then transmit the second transmit light to the other apparatus through the optical cable.

In step S740, the optical communication module may receive second transmit light in return for the transmitting of the second transmit light. For example, upon receiving the second transmit light, a MUX of the other apparatus may output the second transmit light to a ROSA of the other apparatus. The ROSA of the other apparatus may divide the second transmit light into transmit payload data and transmit auxiliary management data and output them to respective circuits. When receiving the transmit auxiliary management data, an auxiliary management controller of the other apparatus may analyze it to recognize a power level, i.e., a receive power level, at which the receive light is received by the optical communication module from the other apparatus. Furthermore, the auxiliary management controller of the other apparatus may determine whether the receive power level is higher than a preset threshold value. When a result of the determining indicates that the receive power level exceeds the threshold value, the auxiliary management controller of the other apparatus may generate a control signal corresponding to the exceeding extent. The auxiliary management controller of the other apparatus may generate auxiliary management data from the control signal and output the auxiliary management data to a TOSA of the other apparatus. The TOSA of the other apparatus may generate second receive light by combining the auxiliary management data corresponding to the control signal with payload data, and output the second receive light to the MUX. The MUX may transmit the second receive light to the optical communication module in question through the optical cable. The optical communication module may then receive the second receive light corresponding to the second transmit light.

In operation S750, the optical communication module may control the reception attenuator based on the control signal included in the second receive auxiliary management data of the second receive light. For example, after receiving the second receive light, the reception attenuator may attenuate the power level of the second receive light based on a preset attenuation rate and then output the attenuated light to the ROSA. The ROSA may divide the second receive light into second receive payload data and second receive auxiliary management data and output the second receive auxiliary management data to the auxiliary management controller. The auxiliary management controller may then control an attenuation rate of the reception attenuator based on the control signal included in the second receive auxiliary management data.

As described above, according to an embodiment of the disclosure, the optical communication module may automatically maintain the power of receive light to a suitable level by controlling the reception attenuator based on the control signal included in the second receive auxiliary management data, i.e., AMCC data, of the second receive light received. In this case, the control signal is generated by the other apparatus, so there is no need for the optical communication module in question to perform extra calculation to control the reception attenuator.

According to embodiments of the disclosure, an optical communication module may properly attenuate a level of an optical signal transmitted without the need for a manager to have to visit the site.

While the disclosure has been shown and described with reference to certain exemplary embodiments thereof, it will be understood by those of ordinary skill in the art that various changes in form and details may be made therein without departing from the spirit and scope of the disclosure as defined by the appended claims and their equivalents.

The invention claimed is:

1. An optical communication module comprising:

an optical transmission assembly configured to generate first transmit light based on an input electric signal and output the first transmit light;

an optical reception assembly configured to divide input first receive light into first receive payload data and first receive auxiliary management data; and an auxiliary management controller configured to analyze the first receive auxiliary management data and control attenuation of receive light input to the optical reception assembly; and a reception attenuator arranged between a multiplexer and the optical reception assembly and configured to attenuate a power level of the receive light input to the optical reception assembly under the control of the auxiliary management controller, wherein the first receive auxiliary management data includes control signal which is generated by another optical communication module, wherein the auxiliary management controller is configured to control the attenuation of the receive light based on the control signal without performing additional calculations to determine a control value, and wherein the first receive light is formed by combining the first receive payload data and the first receive auxiliary management data, and the first receive payload data and the first receive auxiliary management data have different wavelengths.

2. The optical communication module of claim 1, wherein the auxiliary management controller is configured to determine a power level of the first receive light to generate a receive power level, generate and output transmit auxiliary management data including the receive power level to the optical transmission assembly, and wherein the optical transmission assembly is configured to generate second transmit light by combining the transmit auxiliary management data and transmit payload data and output the second transmit light.

3. The optical communication module of claim 1, wherein the auxiliary management controller comprises an auxiliary management and control channel (AMCC) controller, and the receive auxiliary management data is received through the AMCC.

4. An optical communication apparatus including at least one optical communication module, each of the at least one optical communication module comprising:

an optical transmission assembly configured to generate first transmit light based on an input electric signal and output the first transmit light;

an optical reception assembly configured to divide input first receive light into first receive payload data and first receive auxiliary management data; and an auxiliary management controller configured to analyze the first receive auxiliary management data and control attenuation of receive light input to the optical reception assembly; and a reception attenuator arranged between a multiplexer and the optical reception assembly and configured to attenuate a power level of the receive light input to the optical reception assembly under the control of the auxiliary management controller, wherein the first receive auxiliary management data includes a control signal which is generated by another optical communication module, wherein the auxiliary management controller controls the attenuation of the receive light based on said control signal without performing additional calculations to determine a control value, and wherein the first receive light is formed by combining the first receive payload data and the first receive auxiliary management data, and the first receive payload data and the first receive auxiliary management data have different wavelengths.

5. The optical communication apparatus of claim 4, wherein the auxiliary management controller is configured to determine a power level of the first receive light to generate a receive power level, generate and output transmit auxiliary management data including the receive power level to the optical transmission assembly, and wherein the optical transmission assembly is configured to generate second transmit light by combining the transmit auxiliary management data and transmit payload data and output the second transmit light.

6. The optical communication apparatus of claim 4, wherein the auxiliary management controller comprises an auxiliary management and control channel (AMCC) controller, and the receive auxiliary management data is received through the AMCC.

\* \* \* \* \*